Nov. 11, 1930.     H. P. BULKLEY     1,781,364
TWINE HOLDER
Filed May 3, 1928
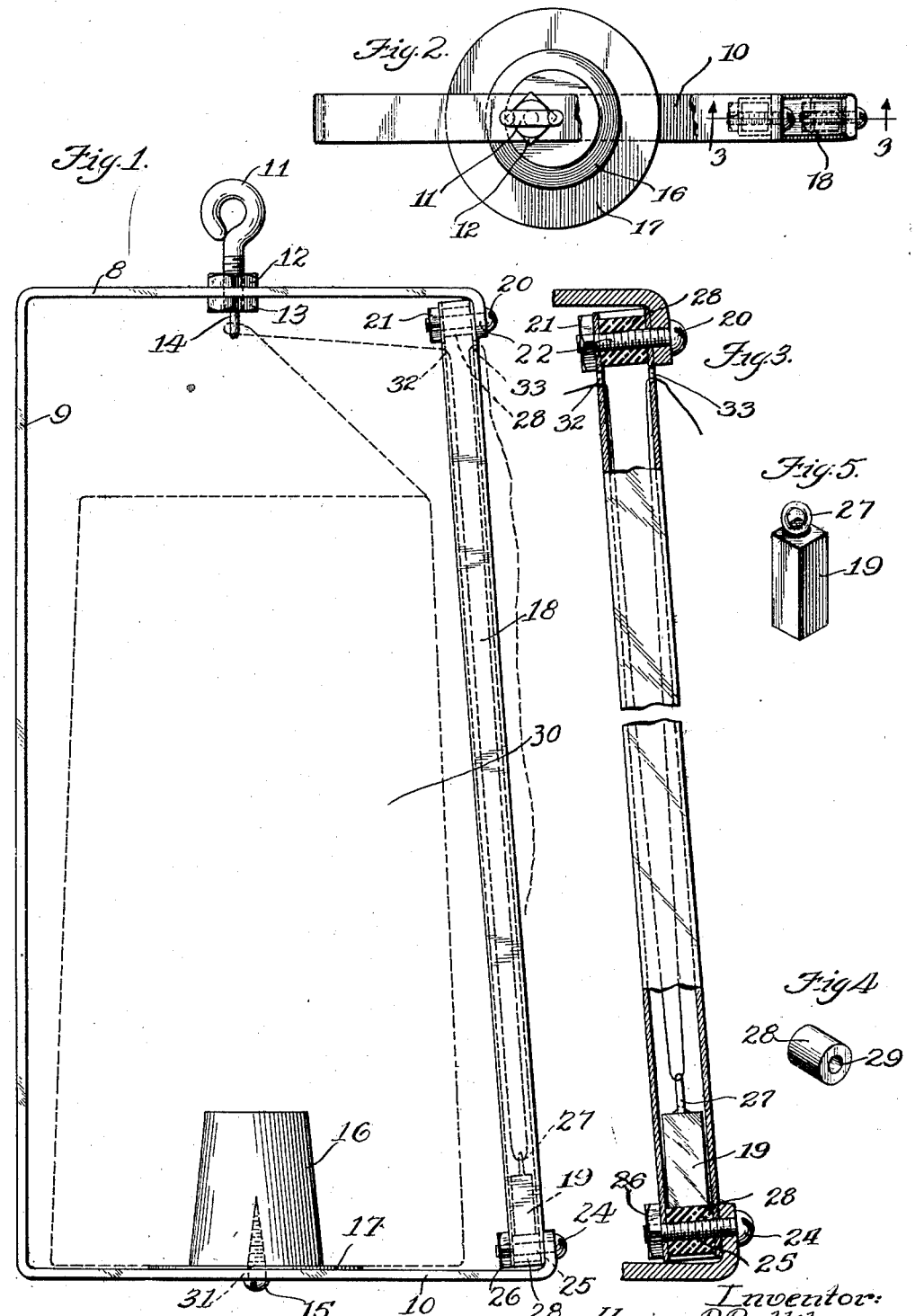

Patented Nov. 11, 1930

1,781,364

UNITED STATES PATENT OFFICE

HENRY P. BULKLEY, OF OAK PARK, ILLINOIS

TWINE HOLDER

Application filed May 3, 1928. Serial No. 274,773.

My invention relates to an improved twine holder.

An object of my invention is the provision of a twine holder of durable construction, which comprises a minimum number of parts, all of which may be economically manufactured from inexpensive materials, and which is so constructed that the loose end of the twine is automatically raised up and out of the way by a weight and no twine will unwind from the ball until the weight is at the top and the string in position to be used.

The foregoing and other features, objects and advantages of my invention will appear from the following detailed description read in connection with the accompanying drawings, in which Fig. 1 is a front elevational view of my twine holder showing the position of the cop of twine in dotted lines;

Fig. 2 is a plan view thereof, with a part broken away to show the twine support;

Fig. 3 is an enlarged fragmentary detailed view partly in section, taken on the line 3—3 of Fig. 2;

Fig. 4 is a perspective view of a cushion; and

Fig. 5 is a perspective view of the weight.

Similar reference characters refer to similar parts throughout the several figures.

The embodiment of my invention herein shown comprises a frame having an upper portion 8, an extended side portion 9 at substantially right angles thereto, and a bottom portion 10 parallel to the upper portion 8. A screw threaded eyelet 11 for detachably suspending the twine holder from a suitable support (not shown) is secured to the frame 8 by means of nuts 12 and 13. An eyelet 14 is rigidly secured to the nut 13 and serves as a guiding means for the twine.

The bottom portion 10 is provided with a central hole 31 for a screw 15 by which a core member 16 is secured to the frame. Interposed between the bottom portion of the frame 10 and the core 16 is a thin metal disc 17 of substantially larger diameter than the core 16, the disc 17 acting as a supporting member for the core and cops of twine.

The frame is provided with a fourth side 18 which is a hollow square shaft in which a weight 19, shown in Fig. 5, travels. The shaft 18 is secured by a bolt 20 to a bent elongation of the upper portion 8. The bolt 20 passes through the frame and a hole in the shaft 18. The bottom portion is secured in the same manner as the top portion. Bolt 24 passes through a hole provided in the upturned portion of the bottom frame 10 and through a hole 25 in the shaft. The square weight 19 travels freely in the shaft 18 and is provided with an eye 27 which is soldered to the weight or secured thereto in any other suitable manner. When the weight is not in operation, its rests upon the tubular cushion 28. The tubular cushion 28 is held in position by the bolt 24 which passes through a hole 29 in the cushion. A similar cushion is placed at the top, being held in position by the bolt 20.

Aligned holes 32 and 33 near the upper end of the shaft 18 permit the passage of the twine. A cop of twine 30 is placed in the twine holder on a support 17. The screw 15 is then screwed into the core 16 of the twine, thereby holding the cop of twine in a rigid position. The twine is then passed through the eyelet 14 from the right and drawn towards the hole 32. Thus, no matter from which direction the twine is fed from the cop to the eyelet, the twine will always make a full loop around the eyelet. This loop about the eyelet 14 is necessary to give the twine the required tension to lift the weight 19, as will hereinafter appear.

The twine holder is then inverted and the weight 19 slides in the shaft 18 until it rests against the cushion 28, at which time the eyelet 27 is in alignment with the holes 32 and 33, forming an unobstructed passageway for the twine. The twine is then passed through the passageway from left to right. The holder is returned to its upright position and the weight 19 slides in the shaft to the bottom, drawing a length of twine twice the length of the travel of the weight through the hole 33 and into the shaft 18. The twine will not be pulled through the hole 32 since the friction, due to the loop about the eyelet 13, is sufficient to overcome the pull of the weight.

The invention is capable of wide variation within equivalent limits and I contemplate such variation as may be desirable or useful in the particular adaptation of the invention shown, or in its adaptation to other devices.

I do not restrict myself in any unessential particulars, but what I claim and desire to secure by Letters Patent is:

A twine dispensing device, comprising a supporting frame, said frame including a sheet metal strip of substantially U-shape having oppositely extending attaching flanges, a non-circular tubular member forming one of the sides of said frame, said tubular member being secured to said attaching flanges, a supporting disc and a core for receiving and supporting a cop of twine, a threaded supporting member carried by said frame and a nut having an eyelet attached thereto carried by said threaded supporting member, a weight having an eyelet, said weight being slidably mounted in said tubular member and said weight having a cross-section complementary to the interior section of said tubular member, and said tubular member having a pair of substantially aligned holes whereby the twine may be looped about the eyelet carried by said nut, passed through one of said holes, through the eyelet of said weight, and through the other of said holes to dispense said twine uniformly.

In witness whereof, I hereunto subscribe my name this 30th day of April, 1928.

HENRY P. BULKLEY.